Aug. 28, 1956     E. S. BECKETT     2,760,445
LOAD COMPACTING MEANS FOR CARGO SPACE
Filed May 5, 1952     2 Sheets-Sheet 1
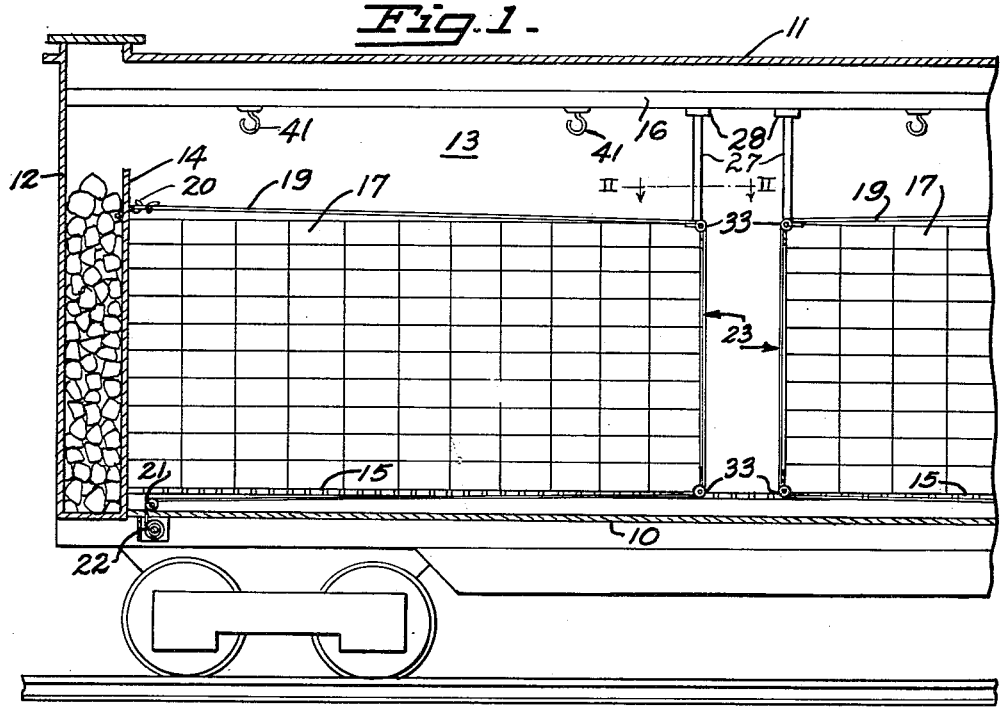
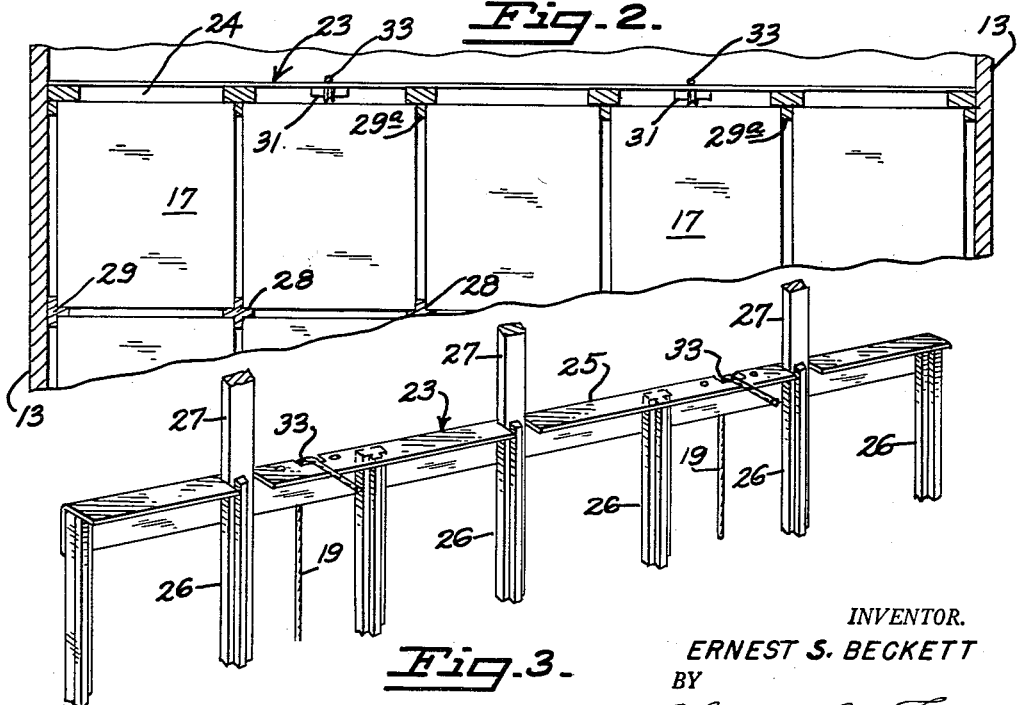
INVENTOR.
ERNEST S. BECKETT
BY
Charles M. Fryer
ATTORNEY

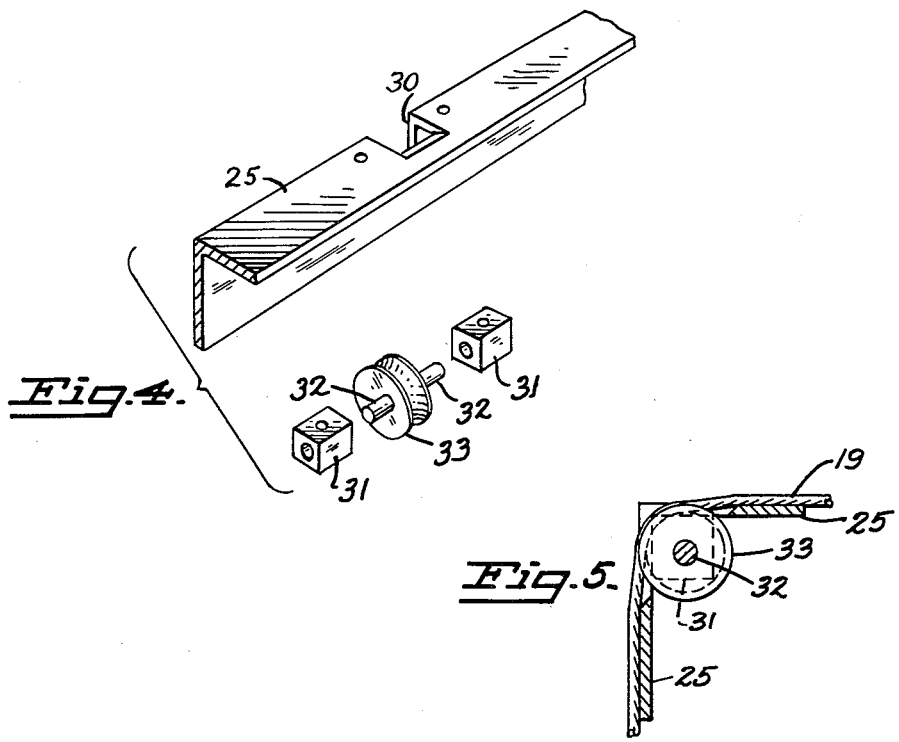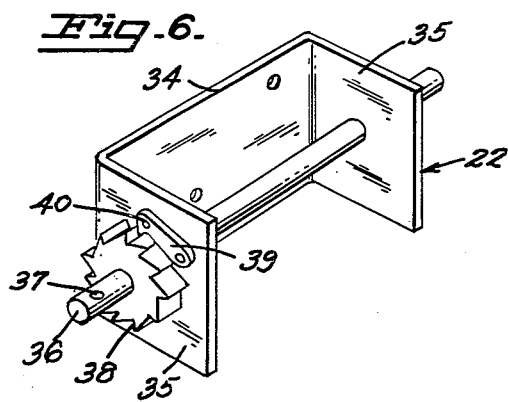

United States Patent Office 2,760,445
Patented Aug. 28, 1956

2,760,445

LOAD COMPACTING MEANS FOR CARGO SPACE

Ernest S. Beckett, Penryn, Calif.

Application May 5, 1952, Serial No. 286,149

1 Claim. (Cl. 105—376)

This invention relates to load compacting means for cargo space and particularly to means for securing small boxes, crates or other package-type cargo in railroad cars, trucks and other transporting means in a manner to prevent both endwise and vertical shifting of the cargo in transit.

It is common practice to load a railroad car or automotive truck by starting against an end wall, then bracing the opposite end of the load with dunnage which is nailed in place to prevent shifting of the load. Dunnage is costly and otherwise undesirable in that its installation and removal are time consuming and wasteful.

The object of the present invention is to provide load compacting and securing means for cargo space which is inexpensive and adjustable to accommodate different loads and will remain in the space as a permanent fixture thereof.

Further and more specific objects and advantages of the invention are made apparent in the following specification wherein the invention is described in detail by reference to the accompanying drawings.

The load compacting means of the present invention is disclosed herein as applied to a railroad refrigerator car but its application to various other carriers will be readily understood from the ensuing description.

In the drawings:

Fig. 1 is a vertical longitudinal section schematically illustrating one end of a railroad refrigerator car in which a load is secured by a compacting and securing means embodying the present invention, Fig. 2 is a fragmentary horizontal sectional view looking downwardly through a load of boxes or the like as on the line II—II in Fig. 1, Fig. 3 is a fragmentary prospective view illustrating the upper portion of an end panel which forms a part of the load compacting means, Fig. 4 is an enlarged fragmentary perspective view of a portion of the same end panel with a guide sheave and bearings illustrated as separated therefrom, Fig. 5 is an enlarged fragmentary sectional view illustrating the same guide sheave and bearings in place, and Fig. 6 is a perspective view of a winch and ratchet mechanism which form a part of the load compacting means.

The refrigerator car schematically illustrated in Fig. 1 comprises a floor 10, roof 11 and end walls, one of which is shown at 12, as well as the usual side walls 13. Ice bunkers are provided in the ends of the car by partitions 14 which serve as end walls for the cargo space within the car. Floor racks illustrated at 15 are also conventional for supporting the cargo in spaced relationship to the floor 10 and a ceiling or structural ceiling beams are represented at 16. The car as shown in Fig. 1 is illustrated as containing a cargo of boxes 17 loaded in the usual manner against the end partitions 14 in tiers that terminate short of the center of the car to provide access space and, according to old methods, to provide space for a squeezing or compressing mechanism used to compact the load before dunnage is applied to secure the load against endwise shifting in the car.

According to the present invention, each unit of the load is compacted and secured in place by means of flexible strands such as wire rope or cable shown at 19 and hereinafter referred to as cables. The cables 19 are secured to the end partition 14 as by hooks 20 then pass over the top of the cargo downwardly over the free ends thereof and back over sheaves 21 secured to the floor 10 of the cargo space and then onto a winch 22 disposed exteriorly of the cargo space and in the present case shown as secured to the underside of the floor 10. In ordinary box cars or in trucks, the sheaves 21 may be eliminated and the cables may pass directly through the end wall to a similar winch secured to the exterior side of the wall.

In order that a few cables, as for example the two cables herein shown, may be employed to compact and secure an entire load, each section of the load is provided with an end panel generally indicated at 23 in Fig. 1 and shown in detail in Figs. 2 and 3. Each of the end panels 23 is generally rectangular in shape and has substantially the same width as the interior of the cargo space so that it will conform in shape to the end of the load. The panels are constructed of a bottom horizontal beam 24, see Fig. 2, and a top horizontal beam 25 shown in Fig. 3. These beams are connected by vertical posts 26 spaced throughout their length. Alternate posts 26 are extended upwardly as shown at 27 so that they will terminate in proximity to the ceiling beam of the car and may be braced against the beam by the use of blocks or the like as indicated at 28 in Fig. 1.

The cargo illustrated in Fig. 2 is made up of fruit boxes or crates which are stacked in separated positions to permit free circulation of cold air between them. The boxes are held in these positions by means of cross shaped posts indicated at 28 and T-shaped posts 29 against the side walls of the cargo space, all of which serve as spacers. Where spacers are used, the posts 26 have spacing cleats 29a secured to them to occupy the spaces between the boxes. However such cleats are unnecessary where the load is not stacked in spaced relationship for refrigerating purposes.

In operation of securing a loaded car, an end panel is placed against the end of the load as shown in Fig. 1 and then the cables 19 are tightened about the load by means of the winches 22 to urge it toward the end 14 of the cargo space. Then the blocks or spacers 28 are placed between the upper ends of the extensions 27 and the ceiling beam 16 to prevent vertical movement of the load.

Since the cables would not pass freely over the edges of the horizontal beams 23, the invention includes sheaves for guiding the cables thereover, the construction and position of which are best shown in Figs. 4 and 5. In these figures, the beam 25 is illustrated as having a notch 30 formed at its edge and as having a pair of bearing blocks 31 adapted to be secured within an angle of the beam to receive trunnions 32 of a sheave 33. Through this simple construction, the cable shown at 19 in Fig. 5 passes freely over the sheave 33 to facilitate its operation and to protect it against the relatively sharp edge of the beam 25.

Any suitable winches may be employed for tightening the cables 19 but a simple structure designed for this purpose is shown in Fig. 6 as a flat plate bent to form a base 34 and end walls 35 which are drilled to provide bearings for a shaft 36 to which the cable may be secured and about which it is wound. One end of the shaft has a perforation 37 through which an operating handle, not shown, may be inserted and a ratchet 38 is secured to the shaft adjacent one of the end walls 35. A pawl 39 is pivoted to the end wall for engagement with the ratchet for latching the shaft 36 against rotation after the cable has been tightened. This pawl may be provided with a perforation 40 and a similar perforation may be provided in the end wall 35 for registration with the perforation 40 when the pawl is in its engaged position. A wire or other securing means may be inserted through the perforations to prevent release of the pawl. A lead seal of the kind used for sealing car doors and the like may be placed on the wire and thus prevent unauthorized release of the cargo compacting means before the car has reached its destination.

While the car is being loaded, the cables 19 are, of course, in a loosened position and hooks such as shown at 41 in Fig. 1 may be provided high on the walls or on the ceiling of the car as shown to hold the cable out of an obstructing position during loading.

I claim:

A load compacting means for cargo space in which cargo is stacked against one wall which comprises, cable securing means on said wall above the stacked cargo, a plurality of single cables each leading from said means over, down beside and under the cargo, and winch means adjacent the wall and beneath the cargo for tensioning the cables and a panel member disposed against the stack of cargo at the side opposite said wall and held against the cargo by the cables, said panel member having top and bottom beams of angular cross section to embrace the top and bottom edges of the cargo, said beams having cut away portions in their edges, and guide sheaves disposed in said cut away portions to receive the cables.

References Cited in the file of this patent

UNITED STATES PATENTS

| | | |
|---|---|---|
| 1,186,035 | Posson | June 6, 1916 |
| 1,694,026 | Whittemore | Dec. 4, 1928 |
| 1,721,563 | Kupelian | July 23, 1929 |
| 1,920,917 | Scales | Aug. 1, 1933 |
| 2,490,434 | Harris | Dec. 6, 1949 |
| 2,494,004 | Ryder et al. | Jan. 10, 1950 |
| 2,509,966 | Cox | May 30, 1950 |